(12) United States Patent
Babu

(10) Patent No.: US 7,484,127 B2
(45) Date of Patent: Jan. 27, 2009

(54) METHOD AND SYSTEM FOR PRESERVING CRASH DUMP IN A DISKLESS SYSTEM

(75) Inventor: Venkatesh Babu, Santa Clara, CA (US)

(73) Assignee: Nokia Siemens Networks OY, Espoo (FI)

( * ) Notice: Subject to any disclaimer, the term of this patent is extended or adjusted under 35 U.S.C. 154(b) by 606 days.

(21) Appl. No.: 11/034,247

(22) Filed: Jan. 13, 2005

(65) Prior Publication Data

US 2006/0156057 A1    Jul. 13, 2006

(51) Int. Cl.
G06F 11/00    (2006.01)

(52) U.S. Cl. .............................. 714/38; 714/23; 713/1; 713/2

(58) Field of Classification Search .................. None
See application file for complete search history.

(56) References Cited

U.S. PATENT DOCUMENTS

| | | | | |
|---|---|---|---|---|
| 5,835,695 | A * | 11/1998 | Noll ................................ | 714/6 |
| 5,860,115 | A * | 1/1999 | Neuhard et al. ............. | 711/147 |
| 6,195,695 | B1 * | 2/2001 | Cheston et al. ............. | 709/221 |
| 6,324,644 | B1 * | 11/2001 | Rakavy et al. ................. | 713/1 |
| 6,591,376 | B1 * | 7/2003 | VanRooven et al. ........... | 714/36 |
| 6,697,972 | B1 * | 2/2004 | Oshima et al. ................. | 714/55 |
| 6,901,493 | B1 * | 5/2005 | Maffezzoni ................. | 711/162 |
| 6,915,420 | B2 * | 7/2005 | Hensley .......................... | 713/2 |
| 6,934,881 | B2 * | 8/2005 | Gold et al. ..................... | 714/15 |
| 6,948,099 | B1 * | 9/2005 | Tallam ......................... | 714/38 |
| 7,000,229 | B2 * | 2/2006 | Gere ........................... | 717/169 |
| 7,219,257 | B1 * | 5/2007 | Mahmoud et al. .............. | 714/6 |
| 7,302,559 | B2 * | 11/2007 | Oguma .......................... | 713/1 |
| 7,370,234 | B2 * | 5/2008 | Stakutis et al. ................. | 714/15 |
| 2004/0172221 | A1 | 9/2004 | Curry, III | |
| 2004/0225929 | A1 | 11/2004 | Agha et al. | |

OTHER PUBLICATIONS

"Mini Kernel Dump High Reliable Capturing Crash Dumps for Linux", Oct. 14, 2004, pp. 1-4, (retrieved from the internet).

* cited by examiner

*Primary Examiner*—Christopher S McCarthy
(74) *Attorney, Agent, or Firm*—Squire, Sanders & Dempsey L.L.P.

(57) ABSTRACT

The invention discloses a method for preserving crash dump data in case of operating system crash in a diskless device. The method and the system according to the invention uses two stage booting where in a primary and a secondary kernel are loaded. The primary kernel is a compact kernel that comprises a limited set of functionality and the secondary kernel is a fully functional kernel used for running applications. In case of a crash of the secondary kernel, the kernel prepares a jump back to the primary kernel. Then the primary kernel preserves the crash dump support data and secondary kernel's RAM contents by sending it to a remote system which can store it on a nonvolatile memory.

32 Claims, 3 Drawing Sheets

METHOD AND SYSTEM FOR PRESERVING CRASH DUMP IN A DISKLESS SYSTEM

FIELD OF THE INVENTION

The invention relates to information and computing systems that are running an operating system. Particularly invention relates to preserving crash dump information on diskless systems.

BACKGROUND OF THE INVENTION

As the electronic devices have turned into complex, most of them have been equipped with an operating system. Operating system is loaded into the memory of the device when the device is turned on. Because of the complexity of the tasks that need to be processed with such devices also the operating systems have turned into complex pieces of software. It is commonly known that complex pieces of software do not function perfectly as they have bugs that usually derive from programming errors. When a regular piece of software crashes because of a bug, it is common to start a debugging tool and check the reason of the crash. However, this might not be possible in case of operating system crash. If the operating system crashes the only solution to continue using it might be rebooting. During the reboot all crash information will be lost. Thus, the debugging is not possible.

This problem has been solved by storing the contents of the RAM memory. In ordinary computers RAM-contents can be stored into a swap partition on a disk. After a crash the computer is booted again but the swap is not cleared. Thus, the contents of the memory during the crash can be analyzed and debugged. Naturally, this solution does not work in a diskless system as there is no swap partition to be used.

One solution could be sending the crash information over a network connection to another computing device that has disk or other storage media for storing the information. However, the communication over a network connection requires properly functioning network device driver and protocol stack. This might not be the case if the system crashes during the boot up sequence. Furthermore, this solution is not applicable if the device does not have network connection at all or the network connection is not suitable for transferring such a data or there is no device that could receive the information.

It is also possible to preserve the information during the boot up sequence. If a crash is notified, the bootloader requests the BIOS to preserve the contents of the RAM during the boot. When new operating system boots up the preserved data is sent to a remote system that has a disk or other means for storing preserved information. The drawback of the solution is that the method requires support from the BIOS. However, all systems do not have a BIOS that supports this type of behavior. Thus, this method cannot be applied in every system.

The most sophisticated prior art method uses primary and secondary kernels. During the boot up the operating system's primary kernel kernel loads the secondary kernel in some predefined location of the memory. Upon crash, the primary kernel jumps to the secondary kernel and which sends the crash information to a remote system, which has a disk or other storage media. However, if the primary kernel crashes during the boot up sequence, it is possible that the secondary kernel has not been loaded yet. Thus, the method is not applicable in cases where primary kernel crashes before loading the secondary kernel.

Thus, there is a need for mechanism for preserving crash information so that a BIOS support is not needed and it must work reliably in all cases of OS problems in a diskless system. Furthermore, the solution should not relay too much on the crashed operating system to preserve the RAM contents.

SUMMARY OF THE INVENTION

The invention discloses a system and a method for preserving crash dump data in a diskless device. The invention uses two stage booting for booting a primary and a secondary kernel. The secondary kernel is a normal operating system kernel that is used for running application programs. The primary kernel is a stripped down version of the secondary kernel. The purpose of the primary kernel is to load secondary kernel and then act as a back up system to which the secondary kernel can jump in case of crash.

The jumping back to the primary kernel is implemented by turning the processor to the unprotected mode. As the unprotected mode does not support virtual memory, the code has to be in virtual address space such that its physical address is exactly same as its virtual address. Thus the code can be executed even if the virtual memory is not available in the unprotected mode. After the jump the primary kernel checks if the secondary kernel has crashed. If the secondary kernel has crashed, the primary kernel preserves the crash dump data. Preserving can be done, for example, by storing the data into a non-volatile memory or by sending it over a network to a remote system. After preserving the crash dump data the primary kernel can boot up the system properly by resetting processor, memory and other components that might have stale information that might affect to the stability of the system.

The benefit of the invention is that it is independent and does not require any assistance from the hardware. Furthermore, the method and the system according to the invention is not hardware or software dependent. Thus, the invention is suitable for any hardware component where storing crash dump data is beneficial. The solution is reliable and preserves the crash dump data in all OS problems.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
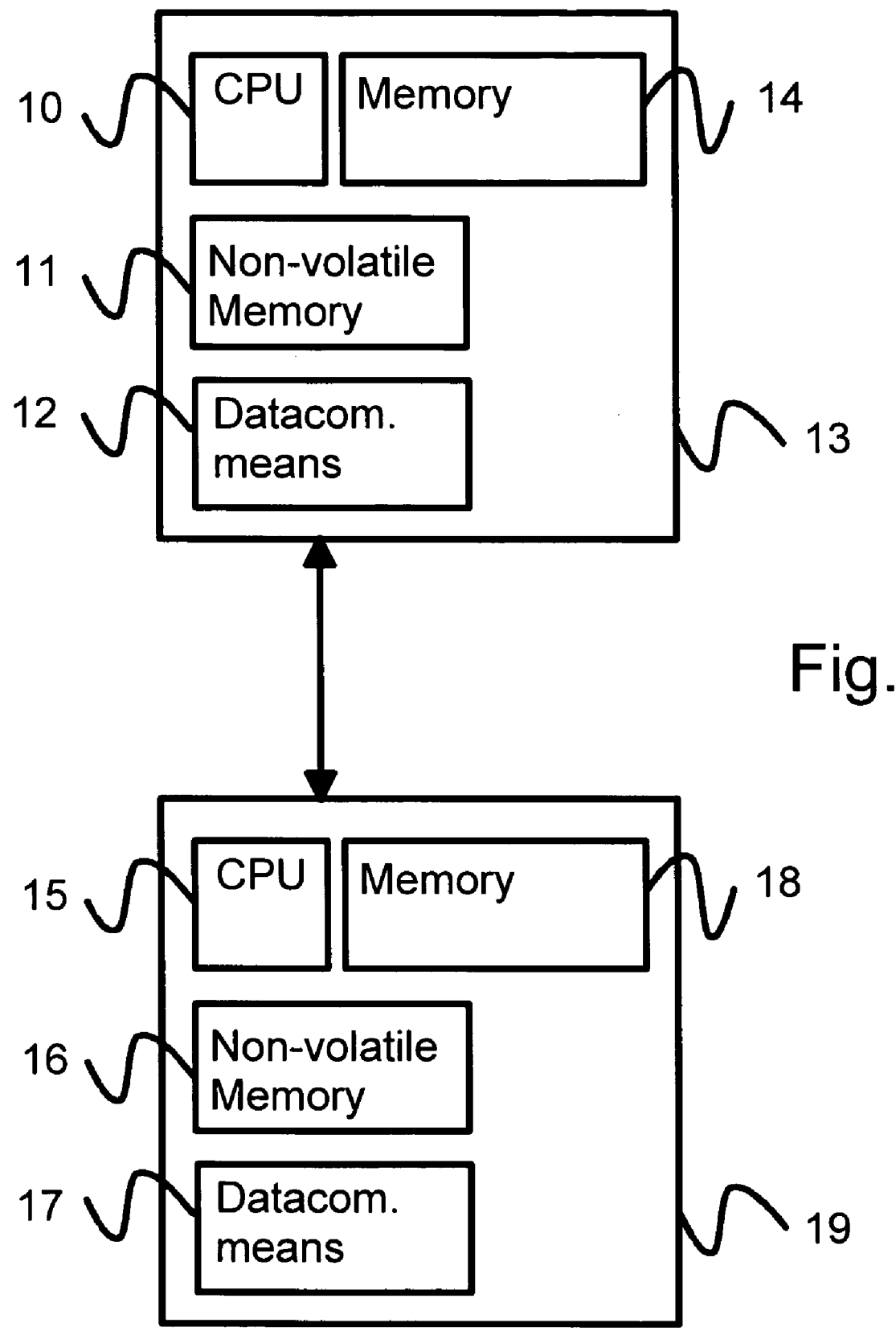
FIG. 1 is a block diagram of the of an example embodiment of the present invention.

In FIG. 1 a block diagram of an example embodiment of the invention is disclosed. The invention is applied in an environment that includes a device that is used and which comprises data that needs to be preserved after a crash. In FIG. 1 there are two devices 13 and 19 presented. In the following example device 13 is the device that requires preserving the crash dump data and device 19 is a device that is connected to a communication network and capable of communicating with the device 13. In the example the device 19 is similar to the device 13 but it is a not requirement.

The device 13 comprises a CPU 10, a non-volatile memory 11, data communication means 12 and a memory 14. Similarly device 19 comprises a CPU 15, a non-volatile memory 16, data communication means 17 and a memory 18. Non-volatile memories 11 and 16 are optional. However, if they are present, they could be, for example, a flash memory 11 and a hard disk 16. It is possible arrange a hard disk into the device 13 also, but the invention is particularly meant for preserving crash dump data in a diskless system. Devices 13 and 19 are connected with a network connection. The connection may be any suitable network connection. For example, if devices 13 and 19 are cellular mobile communication network components, the network would be a mobile communication network. In the following example the state of the memory 14 will be preserved in case of the crash.

Figure 2:
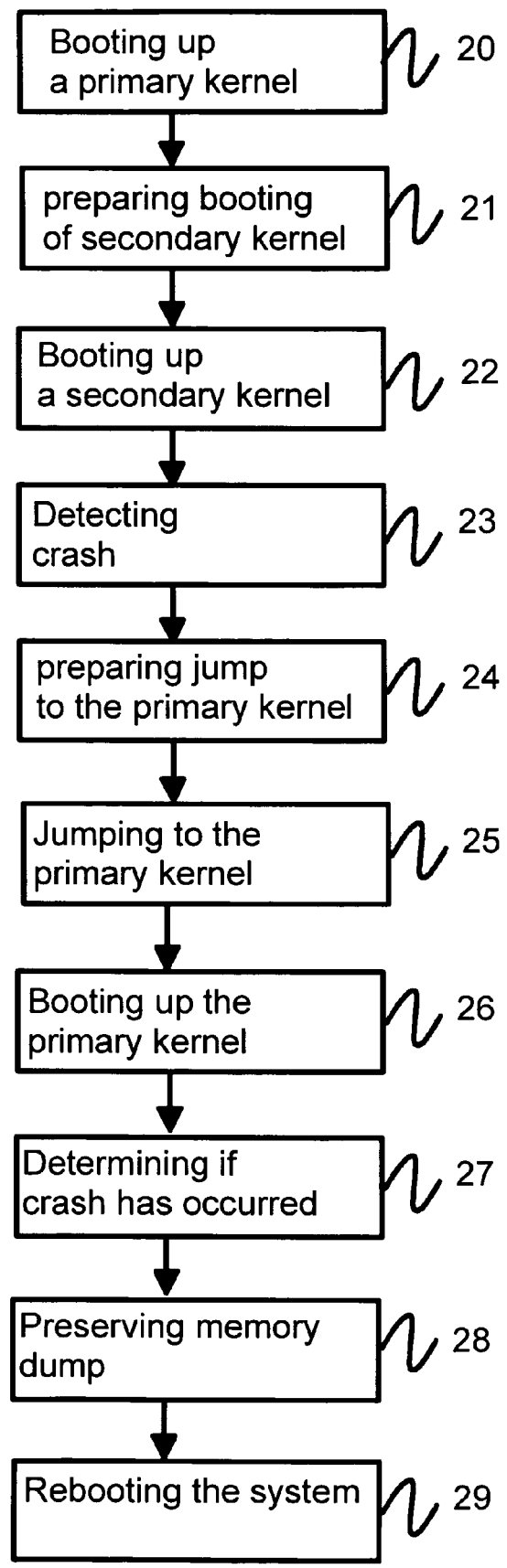
FIG. 2 is a flow chart of an example embodiment of the present invention.

In FIG. 2 a flow chart of a method accordance to the invention is disclosed. In the method a primary and a secondary kernels are used. The method initiates by booting up a primary kernel, step 20. The primary kernel prepares the booting of a secondary kernel, step 21, and boots it, step 22. Typically this is done by using a multistage boot loader that boots up both kernels. The secondary kernel is made available for the applications and the primary kernel is typically a stripped version of the secondary kernel. After the boot up sequence the operating system is fully functional and may be used normally and the user will not notice any difference until a crash situation will occur.

Firstly, a crash situation is detected, step 23. After a crash situation the secondary kernel prepares a jump to the primary kernel, step 24. Preparing the jump comprises for example shutting down drivers that can be shut down. Furthermore, the preparing comprises an important step of turning processor from the protected mode to the unprotected mode. The preparation furthermore comprises a code that sets up segmentation, page and interrupt tables and clears internal caches and buffers. As the unprotected mode does not support virtual memory, the code has to be in virtual address space such that its physical address is exactly same as its virtual address. Thus the code can be executed even if the virtual memory is not available in the unprotected mode. Furthermore, the secondary kernel stores crash dump information to a location, that can be read later. Such locations are for example processor registers, a non-volatile memory, or other similar. If the information contains lot of data, it may be stored into RAM memory and the secondary kernel passes only a pointer to the memory location. The actual jump is typically implemented via a boot loader. The secondary kernel is arranged to execute a jump after the preparation procedure is done, step 25.

The primary kernel starts booting up the system, step 26. During the boot up the procedure the primary kernel determines if a crash situation has occurred previously, step 27. If a crash situation has occurred, the primary kernel starts preserving the state of the secondary kernel. For example, if the secondary kernel has stored crash dump support data (like kernel load address, kernel name, time of crash, bitmap of kernel pages etc) into a memory location, the primary kernel fetches the pointer to the memory location and then retrieves the crash dump support information. Then crash dump support data and secondary kernel's RAM contents are preserved by sending it to a remote system, step 28. If the device comprises a disk or other storable media, the information may be stored on it. After preserving the data, the device may be booted normally by resetting processor, memory and other devices that might affect to the functioning of the operating system. At this stage, the system is ready for rebooting, step 29.

Figure 3:
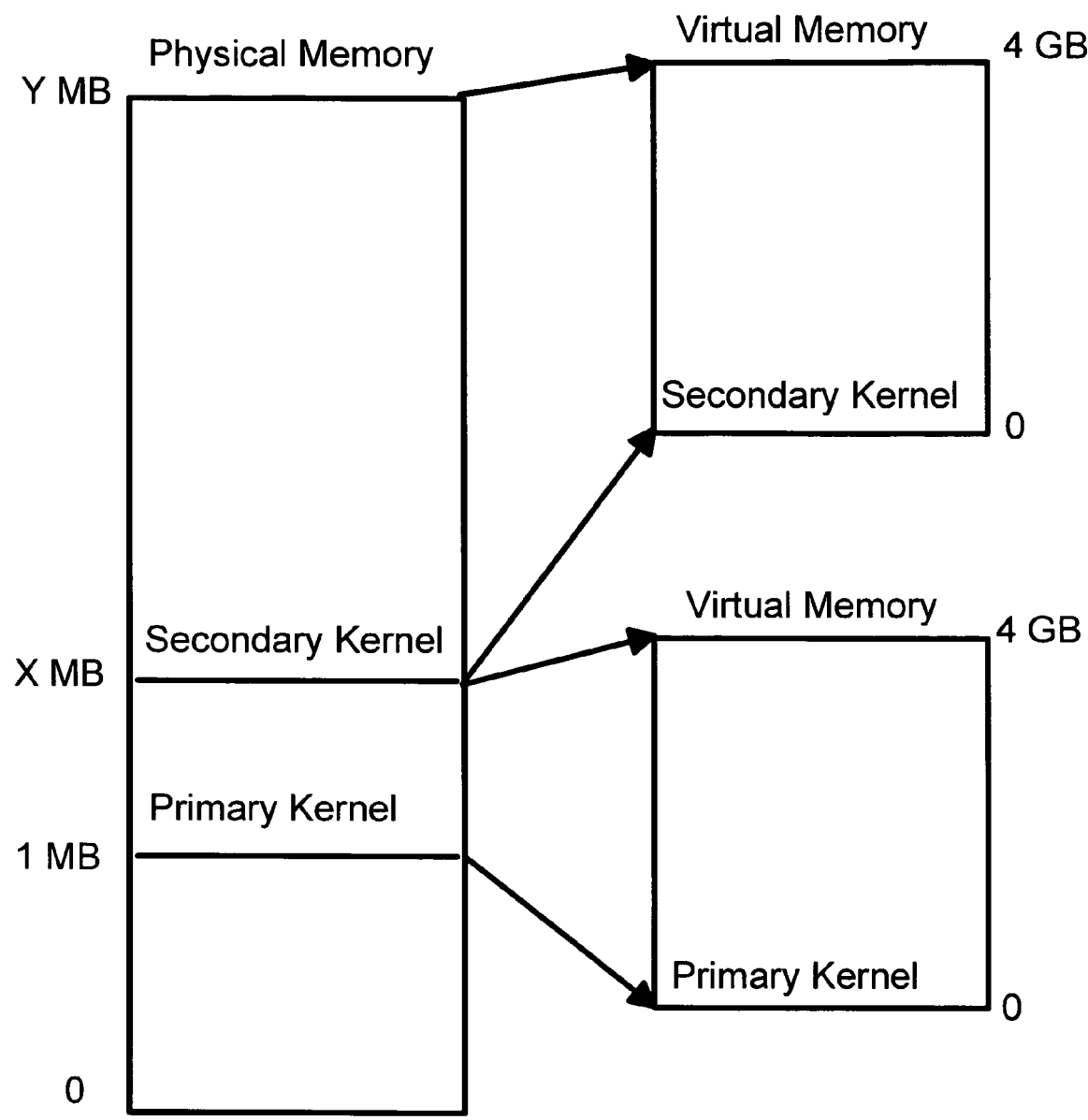
FIG. 3 is a memory structure diagram of an example implementation.

In FIG. 3 a memory structure diagram of an example implementation is disclosed. The figure illustrates how primary and secondary kernels are arranged in the memory. The actual X and Y memory addresses are operating environment dependent and can be chosen by adjusting operating environment, for example, by choosing the operating system or amount of memory.

According to a method disclosed in FIG. 2 a following example implementation framework is provided. The implementation framework is designed to work in Intel based PC compatible environment and it comprises ten steps. Similar implementation according to method disclosed in FIG. 2 may be modified to other environments also.

1. In primary kernel preserve the pointer to the BIOS Interrupt Descriptor Table—IDT.

2. When the secondary kernel crashes create crash dump support data structure, which describes the state of the crashed kernel like physical address of the kernel base and its size, bit map of the kernel pages etc.

3. Preserve the crash dump support data on compact FLASH. It requires only few Kilo Bytes of space.

4. Manipulate the crashed kernel's page tables to get a PA==VA mapped page and relocate the text segment's function exit_to_bootloader( ) to this page and transfer control to it.

Note: Creating PA==VA address space
   i. Statically define a page of memory aligned at page boundary. Any piece of code can be stored in this page.
   ii. At run time determine the physical address (PA) of that page
   iii. Extract page directory component of physical address (bit 31-20)
      pd_offset=(PA>>22) & 0xFFFF FC00
   iv. Extract page table component of physical address (bit 12-21)
      pt_offset=(PA>>12) & 0xFFFF FC00
   v. Obviously, page offset will be 0x0. Just ensure that.
   vi. Extract page directory entry and page table entry of that physical address (PA) and preserve those values

```
old_pde = *(CR3 + pd_offset * 4)
pt_address = old_pde & 0xFFFF F000
if (pt_address != 0) {
    old_pte = *(pt_address + pt_offset * 4)
}
``` vii. Write new page directory table entry

```
if (pt_address == 0) {
    Allocate a new page for page table whose
physical address is PAT
    *(CR3 + pd_offset * 4) = PAT & 0xFFFF F000
    Set the page table permissions and flags
in lower 12 bits.
    pt_address = PAT
}
*(pt_address + pt_offset * 4) = PA & 0xFFFF
F000
    Set the page permissions and flags in lower
12 bits.
``` viii. Now do a long jump to PA and flush TLB.

ix. Now we have PA==VA address space.

5. exit_to_bootloader( ) function disables all interrupts, watchdog, paging mode and protected mode. Then flushes TLB, instruction cache etc. Backs out the earlier changes to the crashed kernel's RAM copy of page table without reloading those changes into the processor's memory management unit. Creates a simple GDT, LDT tables as BIOS does before jumping to bootloader and loads BIOS IDT and then jumps to 0:7C00 address in real mode of the processor.

6. Address 0:7C00 contains first stage of the bootloader called Master Boot Record (MBR), and which loads the second stage of the bootloader and then primary kernel.

7. During the initial stage of booting primary kernel notices that previous secondary kernel was crashed. If so it won't alter the physical memory region of the previous crashed secondary kernel.

8. Once it has booted all the way up, user level dump client interprets the crashed secondary kernel RAM using the crash dump support data structure and transfers the RAM contents to remote system through network interface.

9. After the completion of the dump transfer the card is cleanly reset and rebooted.

10. The server process on remote system preserves the secondary kernel's RAM contents on local hard disk.

Note that this implementation assumes that primary or secondary kernel doesn't alter the BIOS address space below 1 MB region. So when the control is transferred from secondary kernel to bootloader it can access the same BIOS resources.

In an alternative solution it is possible to allocate two spare pages for storing page directory table and page table and fill it with original contents and then modify the spare pages and then update CR3 register. While dumping the image original page tables can be used.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
  loading and booting a primary operating system kernel;
  preparing environment for booting a secondary operating system kernel by said primary kernel;
  loading and booting a secondary operating system kernel, wherein both said primary kernel and said secondary kernel are loaded and booted before a crash;
  in case of a crash,
    preparing said secondary kernel for jumping back to said primary kernel; and
    preserving crash dump data and jumping back to said primary kernel for storing the preserved data.

2. The method according to claim 1, wherein said primary kernel is a stripped version of said secondary kernel.

3. The method according to claim 1, wherein said jumping back to said primary kernel is performed through a boot loader.

4. The method according to claim 3, wherein said primary kernel is configured to determine if the secondary kernel has crashed.

5. The method according to claim 1, said preparing for jumping back to said primary kernel further comprising:
  changing a processor from a protected mode to an unprotected mode;
  setting up a segmentation, a page and interrupt tables; and
  clearing internal caches and buffers.

6. The method according to claim 5, wherein said changing to unprotected mode comprises arranging program code, in virtual memory and physical memory, into exactly same addresses for allowing said changing.

7. The method according to claim 1, wherein preserving crash dump data comprises storing crash dump support data into a non-volatile memory.

8. The method according to claim 1, wherein preserving crash dump data comprises storing crash dump data by transferring said crash dump data to a remote system.

9. A computer program embodied on a computer readable medium, said computer program for preserving crash dump data in a diskless system in a situation where operating system crashes, wherein the computer program performs a method when executed in a data-processing device, the method comprising:
  loading and booting a primary operating system kernel;
  preparing environment for booting a secondary operating system kernel by said primary kernel;
  loading and booting a secondary operating system kernel, wherein both said primary kernel and said secondary kernel are loaded and booted before a crash;
  in case of a crash,
    preparing said secondary kernel for jumping back to said primary kernel; and
    jumping back to said primary kernel for preserving secondary kernel's random access memory contents and crash dump support data.

10. The computer program according to claim 9, wherein said primary kernel is a stripped version of said secondary kernel.

11. The computer program according to claim 9, wherein said jumping back to said primary kernel is performed through a boot loader.

12. The computer program according to claim 11, wherein said primary kernel is configured to determine if the secondary kernel has crashed.

13. The computer program according to claim 9, said preparing for jumping back to said primary kernel further comprising:
  changing a processor from protected mode to unprotected mode;
  setting up a segmentation, a page and interrupt tables; and
  clearing internal caches and buffers.

14. The computer program according to claim 13, wherein said changing to unprotected mode comprises arranging program code, in virtual memory and physical memory, into exactly same addresses for allowing said changing.

15. The computer program according to claim 9, wherein preserving crash dump data comprises storing crash dump support data into a non-volatile memory.

16. The computer program according to claim 9, wherein preserving crash dump data comprises storing crash dump data by transferring said crash dump data to a remote system.

17. An apparatus, comprising:
  a memory configured to store data and program code;
  a processor configured to execute said program code;
  a primary kernel configured to be loaded into said memory; and
  a secondary kernel configured to execute applications that is loaded into said memory,
  wherein said primary kernel and said secondary kernel are each configured to be loaded into said memory and booted before a crash, and
  wherein in case of a crash the apparatus is configured to jump from said secondary kernel to said primary kernel.

18. The apparatus according to claim 17, wherein said primary kernel is a stripped version of said secondary kernel.

19. The apparatus according to claim 17, wherein said device further comprises a boot loader for jumping back to said primary kernel.

20. The apparatus according to claim 19, wherein said primary kernel is configured to determine if the secondary kernel has crashed.

21. The apparatus according to claim 17, wherein said processor comprises protected and unprotected modes.

22. The apparatus according to claim 17, wherein said device further comprises a non-volatile memory configured to store crash dump data.

23. The apparatus according to claim 17, wherein said device further comprises a connection to a remote system configured to store crash dump data by transferring said crash dump data to said remote system.

24. A system, comprising:
a first device;
a second device; and
a network connection between said devices,
the first device comprising
a memory configured to store data and program code;
a processor configured to execute said program code;
a primary kernel configured to be loaded into said memory; and
a secondary kernel configured to execute applications that is loaded into said memory, wherein said primary kernel and said secondary kernel are each configured to be loaded into said memory and booted before a crash, and
wherein in case of a crash the first device is configured to jump from said secondary kernel to said primary kernel.

25. The system according to claim 24, wherein said primary kernel of the first device is a stripped version of said secondary kernel of the first device.

26. The system according to claim 24, wherein said first device further comprises a boot loader for jumping back to said primary kernel.

27. The system according to claim 26, wherein said primary kernel is configured to determine if the secondary kernel has crashed.

28. The system according to claim 24, wherein said processor of the first device comprises protected and unprotected modes.

29. The system according to claim 24, wherein said first device further comprises a non-volatile memory configured to store crash dump data.

30. The system according to claim 24, wherein said first device further comprises a connection to a remote system configured to store crash dump data by transferring said crash dump data to said remote system.

31. The system according to claim 30, wherein said second device is configured to receive the crash dump data sent by the first device.

32. An apparatus, comprising:
storing means for storing data and program code;
executing means for executing said program code;
primary application execution means for executing applications that is loaded into said storing means; and
secondary application execution means for executing applications that is loaded into said storing means,
wherein said primary application execution means and said secondary application execution means are each configured to be loaded into said storing means and booted before a crash, and
wherein in case of a crash the apparatus is configured to jump from said secondary application execution means to said primary application execution means.

* * * * *